US012272487B2

(12) United States Patent
Kato et al.

(10) Patent No.: US 12,272,487 B2
(45) Date of Patent: Apr. 8, 2025

(54) MULTILAYER COIL COMPONENT

(71) Applicant: TDK CORPORATION, Tokyo (JP)

(72) Inventors: Hajime Kato, Tokyo (JP); Junichiro Urabe, Tokyo (JP); Yuto Shiga, Tokyo (JP); Kazuya Tobita, Tokyo (JP); Youichi Kazuta, Tokyo (JP); Noriaki Hamachi, Tokyo (JP); Toshinori Matsuura, Tokyo (JP); Yuichi Takubo, Tokyo (JP); Munehiro Takaku, Tokyo (JP)

(73) Assignee: TDK CORPORATION, Tokyo (JP)

( * ) Notice: Subject to any disclaimer, the term of this patent is extended or adjusted under 35 U.S.C. 154(b) by 814 days.

(21) Appl. No.: 17/177,421

(22) Filed: Feb. 17, 2021

(65) Prior Publication Data

US 2021/0272743 A1 Sep. 2, 2021

(30) Foreign Application Priority Data

Feb. 27, 2020 (JP) ................................ 2020-031753

(51) Int. Cl.
*H01F 27/28* (2006.01)
*H01F 17/00* (2006.01)
*H01F 17/02* (2006.01)
*H01F 27/29* (2006.01)

(52) U.S. Cl.
CPC ....... *H01F 27/292* (2013.01); *H01F 17/0013* (2013.01); *H01F 17/02* (2013.01)

(58) Field of Classification Search
CPC .... H01F 27/292; H01F 17/0013; H01F 17/02; H01F 17/00; H01F 27/28; H01F 27/29; H01F 2017/0026; H01F 2017/0073; H01F 27/2804; H01F 2027/2809
See application file for complete search history.

(56) References Cited

U.S. PATENT DOCUMENTS 11,315,721 B2 * 4/2022 Yokoyama ............. H05K 1/181
2002/0083575 A1 * 7/2002 Anbo .................. H01F 17/0013
336/221

(Continued)

FOREIGN PATENT DOCUMENTS

JP 2003-17327 A 1/2003
JP 2003-92214 A 3/2003

(Continued)

*Primary Examiner* — Mang Tin Bik Lian
(74) *Attorney, Agent, or Firm* — Oliff PLC

(57) ABSTRACT

A multilayer coil component includes an element body, a coil, and a terminal electrode. The element body includes a first main face, second main face, first end face, second end face, first side face and second side face. The terminal electrode is connected to the coil. The terminal electrode includes a main-face electrode portion provided on the first main face. The coil includes a plurality of coil conductors. The plurality of coil conductors includes a first coil conductor disposed closest to the first main face to oppose to the main-face electrode portion and a second coil conductor disposed closer to the second main face than the first coil conductor. The first coil conductor has a width narrower than a width of the second coil conductor. The first coil conductor has an aspect ratio higher than an aspect ratio of the second coil conductor.

10 Claims, 11 Drawing Sheets

(56) References Cited

U.S. PATENT DOCUMENTS

| | | | | |
|---|---|---|---|---|
| 2010/0194513 | A1* | 8/2010 | Ozawa | H05K 1/165 336/200 |
| 2011/0140564 | A1* | 6/2011 | Nomura | H01F 41/041 336/200 |
| 2014/0373341 | A1* | 12/2014 | Yamauchi | H01F 41/041 29/609 |
| 2015/0028988 | A1* | 1/2015 | Yamauchi | H01F 27/2804 336/200 |
| 2017/0365386 | A1 | 12/2017 | Arai et al. | |
| 2017/0372833 | A1* | 12/2017 | Jang | H01F 17/0013 |
| 2018/0061554 | A1* | 3/2018 | Okura | H01F 27/2804 |
| 2018/0358171 | A1* | 12/2018 | Jung | H01F 17/0013 |
| 2018/0374627 | A1* | 12/2018 | Ryu | H01F 17/04 |
| 2019/0103209 | A1 | 4/2019 | Nagano et al. | |
| 2019/0180905 | A1* | 6/2019 | Ryu | H01F 17/04 |
| 2019/0304654 | A1* | 10/2019 | Choi | H01F 27/255 |
| 2021/0233698 | A1* | 7/2021 | Takahashi | H01F 41/041 |
| 2021/0272734 | A1 | 9/2021 | Nagano et al. | |

FOREIGN PATENT DOCUMENTS

| | | | |
|---|---|---|---|
| JP | 2014-022426 | A | 2/2014 |
| JP | 2017-228768 | A | 12/2017 |
| JP | 2019-067870 | A | 4/2019 |

* cited by examiner

MULTILAYER COIL COMPONENT

TECHNICAL FIELD

The present disclosure relates to a multilayer coil component.

BACKGROUND

Japanese Unexamined Patent Publication No. 2014-22426 discloses a multilayer inductor including a laminate formed by laminating a plurality of magnetic material layers, a coil disposed in the laminate, and an external electrode provided on the lower face of the laminate. In this multilayer inductor, the coil and the external electrode are disposed to be opposed to each other.

SUMMARY

In the multilayer inductor, stray capacitance (parasitic capacitance) is formed between the coil and the external electrode. This deteriorates the characteristics of the multilayer inductor.

One aspect of the present disclosure provides a multilayer coil component capable of preventing deterioration in characteristics.

A multilayer coil component according to one aspect of the present disclosure includes an element body, a coil, and a terminal electrode. The element body has a rectangular parallelepiped shape. The element body includes a first main face and a second main face opposed to each other in a first direction, a first end face and a second end face opposed to each other in a second direction intersecting the first direction, and a first side face and a second side face opposed to each other in a third direction intersecting the first direction and the second direction. The coil includes a coil axis along the first direction and is disposed in the element body. The terminal electrode is electrically connected to the coil. The terminal electrode includes a main-face electrode portion provided on the first main face. The coil includes a plurality of coil conductors disposed to be separated from each other in the first direction and electrically connected to each other. The plurality of coil conductors includes a first coil conductor disposed closest to the first main face to oppose to the main-face electrode portion and a second coil conductor disposed closer to the second main face than the first coil conductor. The first coil conductor has a width narrower than a width of the second coil conductor. The first coil conductor has an aspect ratio higher than an aspect ratio of the second coil conductor.

In this multilayer coil component, the first coil conductor is disposed closest to the first main face among the plurality of coil conductors and is opposed to the main-face electrode portion. Thus, stray capacitance is formed between the first coil conductor and the main-face electrode portion depending on the area where the first coil conductor is opposed to the main-face electrode portion. The width of the first coil conductor is narrower than the width of the second coil conductor disposed closer to the second main face than the first coil conductor. Thus, the area where the first coil conductor is opposed to the main-face electrode portion is smaller than that when the width of the first coil conductor is about equal to the width of the second coil conductor. As a result, it is possible to reduce the stray capacitance formed between the first coil conductor and the main-face electrode portion. Accordingly, it is possible to prevent the self-resonant frequency (SRF) of the multilayer coil component from lowering. The first coil conductor has an aspect ratio higher than an aspect ratio of the second coil conductor. Thus, it is possible to increase the cross-sectional area of the first coil conductor as compared with the aspect ratio of the first coil conductor being about equal to the aspect ratio of the second coil conductor. Accordingly, it is possible to prevent the Q value of the multilayer coil component from decreasing. From the above, it is possible to prevent deterioration in the characteristics of the multilayer coil component.

The cross-sectional area of the first coil conductor may be equal to the cross-sectional area of the second coil conductor. In this case, it is possible to reliably prevent the Q value from decreasing.

The plurality of coil conductors may have a width becoming narrower toward the first main face and an aspect ratio becoming higher toward the first main face. Thus, it is possible to further prevent the deterioration in the characteristics of the multilayer coil component.

The first coil conductor may have, when viewed from the first direction, an outer edge aligning with an outer edge of the second coil conductor. In this case, the inner diameter of the first coil conductor is increased, and it is possible to improve the Q value and the inductance (L).

The terminal electrode may further include an end-face electrode portion provided on the first end face. The first coil conductor may be opposed to the end-face electrode portion. The first coil conductor may have, when viewed from the first direction, an inner edge aligning with an inner edge of the second coil conductor. In this case, the distance between the first coil conductor and the end-face electrode portion is widened, and it is possible to reduce the stray capacitance formed between the first coil conductor and the end-face electrode portion. Accordingly, it is possible to further prevent the self-resonant frequency of the multilayer coil component from lowering.

The coil may include a pair of first coil regions opposed to each other sandwiching the coil axis in the second direction and a pair of second coil regions opposed to each other sandwiching the coil axis in the third direction. When viewed from the first direction, the inner edge of the first coil conductor may align with the inner edge of the second coil conductor in the pair of first coil regions, and an outer edge of the first coil conductor may align with an outer edge of the second coil conductor in the pair of second coil regions. In this case, the distance between the first coil conductor and the end-face electrode portion is widened in the second coil region, and it is possible to reduce the stray capacitance formed between the first coil conductor and the end-face electrode portion. Accordingly, it is possible to prevent the self-resonant frequency of the multilayer coil component from lowering. In addition, the inner diameter of the first coil conductor is increased in the second coil region, and it is possible to improve the Q value and the inductance (L). From the above, it is possible to improve the Q value and the inductance (L) while further preventing the self-resonant frequency of the multilayer coil component from lowering.

DETAILED DESCRIPTION

Hereinafter, embodiments of the present invention will be described in detail with reference to the accompanying drawings. In the description of the drawings, identical or equivalent elements are denoted by the same reference signs, and overlapped descriptions are omitted.

First Embodiment

Figure 1:
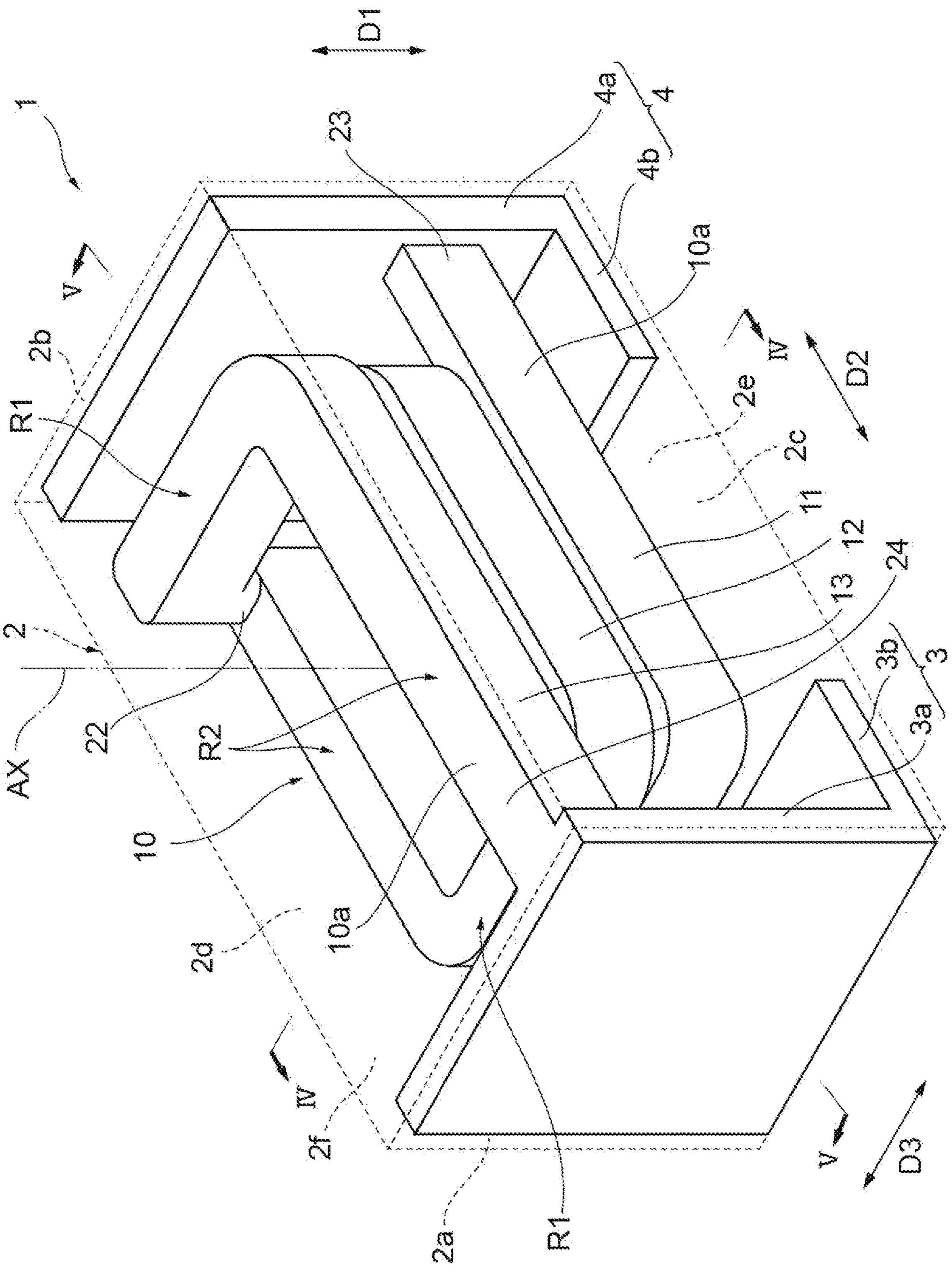
FIG. 1 is a perspective view of a multilayer coil component according to a first embodiment.
Figure 2:
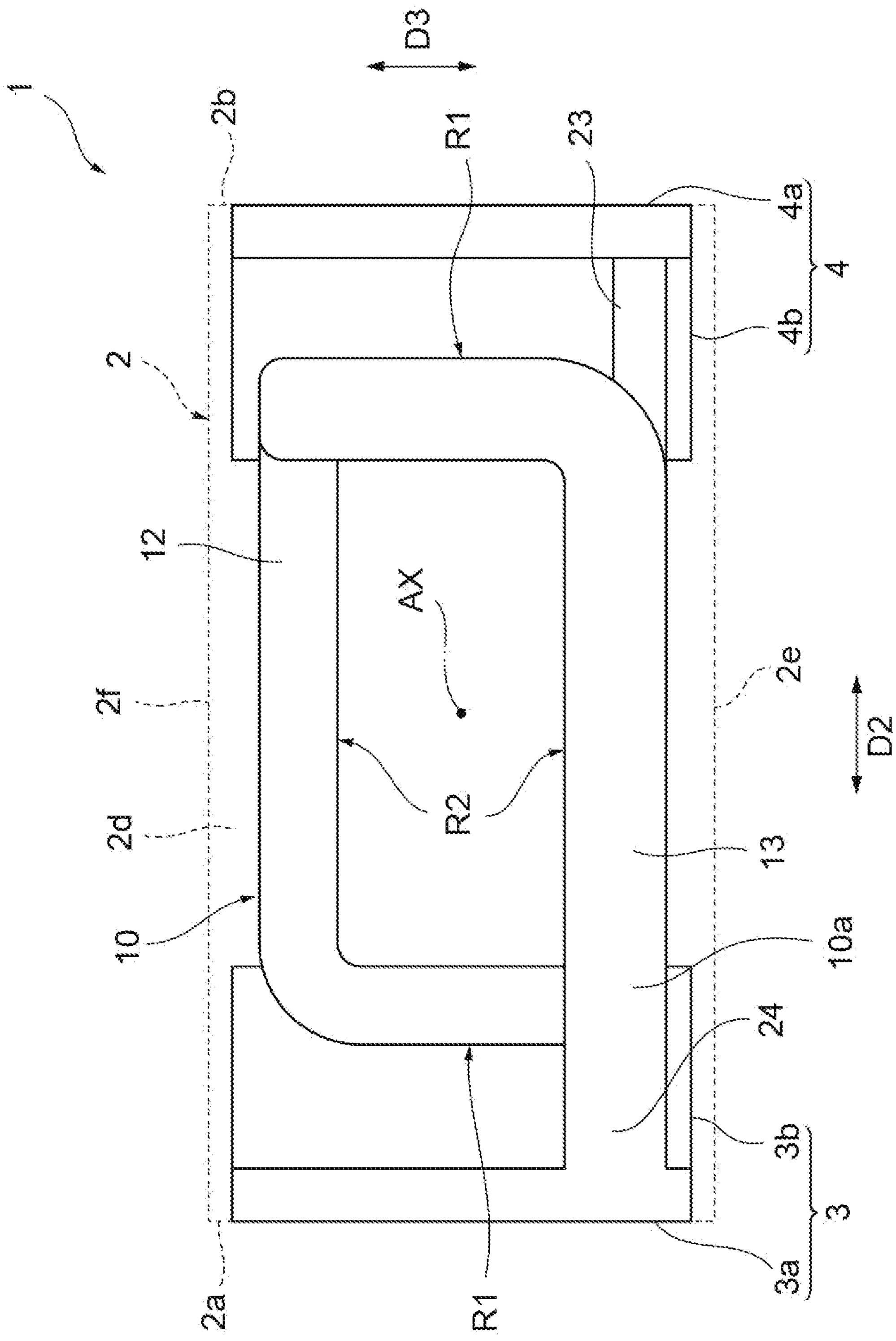
FIG. 2 is a top view of the multilayer coil component in FIG. 1.
Figure 3:
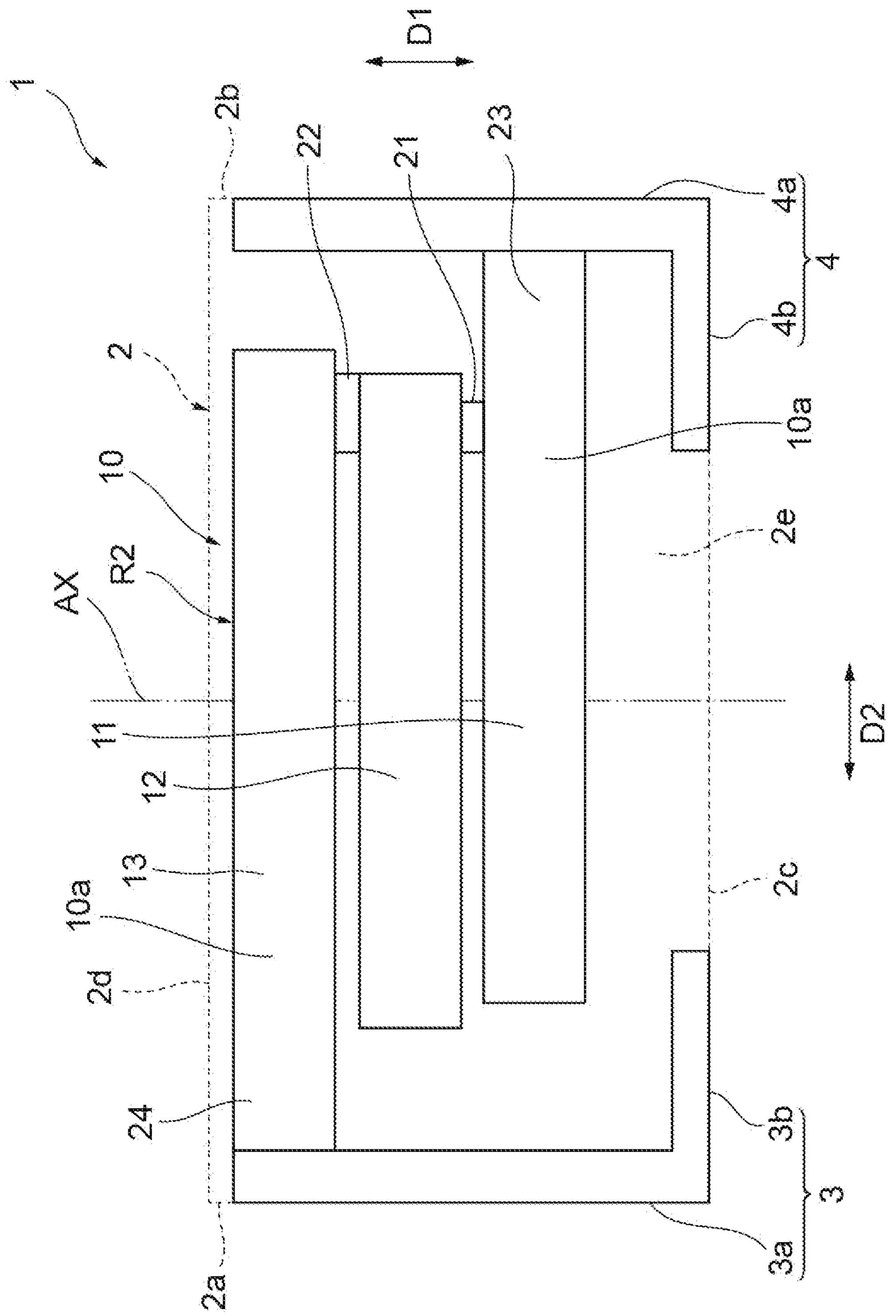
FIG. 3 is a side view of the multilayer coil component in FIG. 1.

With reference to FIGS. 1 to 5, a multilayer coil component 1 according to a first embodiment will be described. The multilayer coil component 1 includes an element body 2 having a rectangular parallelepiped shape, terminal electrodes 3 and 4 disposed at respective end portions of the element body 2, a coil 10, and connecting conductors 23 and 24. The rectangular parallelepiped shape includes a rectangular parallelepiped shape in which the corner portions and the ridge portions are chamfered, and a rectangular parallelepiped shape in which the corner portions and the ridge portions are rounded. In FIGS. 1 to 3, the element body 2 is shown by a broken line.

The element body 2 has end faces 2*a* and 2*b* opposed to each other, main faces 2*c* and 2*d* opposed to each other, and side faces 2*e* and 2*f* opposed to each other. In the following description, it is assumed that the direction in which the main faces 2*c* and 2*d* are opposed to each other is a first direction D1, that the direction in which the end faces 2*a* and 2*b* are opposed to each other is a second direction D2, and that the direction in which the side faces 2*e* and 2*f* are opposed to each other is a third direction D3. The first direction D1, the second direction D2, and the third direction D3 intersect each other. The first direction D1, the second direction D2, and the third direction D3 are orthogonal to each other in this embodiment. In the present embodiment, the first direction D1 is the height direction of the element body 2. The second direction D2 is the length direction of the element body 2. The second direction D2 is also the long-sides direction of the main faces 2*c* and 2*d*. The third direction D3 is the width direction of the element body 2. The third direction D3 is also the short-sides direction of the main faces 2*c* and 2*d*.

The end faces 2*a* and 2*b* extend in the first direction D1 in such a way as to connect the main faces 2*c* and 2*d*. The end faces 2*a* and 2*b* also extend in the third direction D3 in such a way as to connect the side faces 2*e* and 2*f*. The main faces 2*c* and 2*d* extend in the second direction D2 in such a way as to connect the end faces 2*a* and 2*b*. The main faces 2*c* and 2*d* also extend in the third direction D3 in such a way as to connect the side faces 2*e* and 2*f*. The side faces 2*e* and 2*f* extend in the second direction D2 in such a way as to connect the end faces 2*a* and 2*b*. The side faces 2*e* and 2*f* also extend in the first direction D1 in such a way as to connect the main faces 2*c* and 2*d*. The multilayer coil component 1 is, for example, solder-mounted on an electronic device. The electronic device is, for example, a circuit board or an electronic component. In the multilayer coil component 1, the main face 2*c* constitutes a mounting surface opposed to the electronic device.

The element body 2 is formed by laminating a plurality of insulator layers (not shown) in the first direction D1. The element body 2 includes a plurality of insulator layers laminated in the first direction D1. In the element body 2, the lamination direction in which the insulator layers are laminated is aligned with the first direction D1. In the actual element body 2, the insulator layers are integrated in such a way that boundaries between the insulator layers cannot be visually recognized.

Each insulator layer is formed of a dielectric material containing a glass component. That is, the element body 2 contains, as a compound of the elements constituting the element body 2, a dielectric material containing a glass component. The glass component is, for example, borosilicate glass. The dielectric material is, for example, $BaTiO_3$-based, Ba(Ti, Zr)$O_3$-based, or (Ba, Ca)$TiO_3$-based dielectric ceramic. Each insulator layer is formed by a sintered body of a ceramic green sheet containing a glass-ceramic material.

The terminal electrodes 3 and 4 are electrically connected to the coil 10. The terminal electrodes 3 and 4 are disposed at the respective end portions of the element body 2 in the second direction D2. The terminal electrodes 3 and 4 are separated from each other in the second direction D2. The terminal electrodes 3 and 4 are embedded in the element body 2. The terminal electrodes 3 and 4 are disposed in two recesses provided at the respective end portions of the element body 2 in the second direction D2. The two recesses are formed in shapes corresponding to the terminal electrodes 3 and 4. The terminal electrodes 3 and 4 are in contact with the inner surfaces of the respective recesses. The terminal electrodes 3 and 4 have, for example, the same shape.

The terminal electrode 3 is provided on the end face 2*a* side of the element body 2. The terminal electrode 3 is provided from the end face 2*a* to the main face 2*c*. The terminal electrode 3 is disposed in the recess provided from the end face 2*a* to the main face 2*c* of the element body 2. In the present embodiment, the surface of the terminal electrode 3 is substantially flush with the end face 2*a* and the main face 2*c*.

The terminal electrode 3 has an L shape when viewed from the third direction D3. The terminal electrode 3 includes an electrode portion 3*a* and an electrode portion 3*b*. The electrode portion 3*a* and the electrode portion 3*b* are connected at the ridge portion (the corner portion formed by the main face 2*c* and the end face 2*a*) of the element body 2, and are electrically connected to each other. In the present embodiment, the electrode portion 3*a* and the electrode portion 3*b* are integrally provided and are continuous with each other. The electrode portion 3*a* is provided on the end face 2*a* and extends along the first direction D1. The electrode portion 3*a* has a rectangular shape when viewed from the second direction D2. The electrode portion 3*b* is provided on the main face 2*c* and extends along the second direction D2. The electrode portion 3*b* has a rectangular shape when viewed from the first direction D1.

The terminal electrode 4 is provided on the end face 2*b* side of the element body 2. The terminal electrode 4 is disposed from the end face 2*b* to the main face 2*c*. The terminal electrode 4 is disposed in the recess provided from the end face 2*b* to the main face 2*c* of the element body 2. In the present embodiment, the surface of the terminal electrode 4 is substantially flush with the end face 2*b* and the main face 2*c*.

The terminal electrode 4 has an L shape when viewed from the third direction D3. The terminal electrode 4 includes an electrode portion 4*a* and an electrode portion 4*b*. The electrode portion 4*a* and the electrode portion 4*b* are connected at the ridge portion (the corner portion formed by the main face 2*c* and the end face 2*b*) of the element body 2, and are electrically connected to each other. In the present embodiment, the electrode portion 4*a* and the electrode portion 4*b* are integrally provided and are continuous with each other. The electrode portion 4*a* is provided on the end face 2*b* and extends along the first direction D1. The electrode portion 4*a* has a rectangular shape when viewed from the second direction D2. The electrode portion 4*b* is provided on the main face 2*c* and extends along the second direction D2. The electrode portion 4*b* has a rectangular shape when viewed from the first direction D1.

The terminal electrodes 3 and 4 each are formed by, for example, laminating a plurality of electrode layers. The electrode layers each are provided in a defective portion formed in the corresponding insulator layer. The defective portions form the recesses in which the terminal electrodes 3 and 4 are disposed. The electrode layers are formed by firing a conductive paste. The conductive paste contains a metal component and a glass component. The metal component is contained in a conductive material and is, for example, Ag or Pd. The glass component is a compound of the elements constituting the element body 2 and is the same component as the glass component contained in the element body 2. The content of the glass component is only required to be appropriately set. In the actual terminal electrodes 3 and 4, the electrode layers are integrated in such a way that boundaries between the electrode layers cannot be visually recognized.

The coil 10 and the connecting conductors 23 and 24 are disposed in the element body 2 and are not exposed from the element body 2. The coil 10 has a pair of end portions 10*a*. A first end portion 10*a* is electrically connected to the terminal electrode 4 by the connecting conductor 23. A second end portion 10*a* is electrically connected to the terminal electrode 3 by the connecting conductor 24. The coil 10 includes a coil axis AX along the first direction D1.

The coil 10 includes a plurality of coil conductors 11, 12, and 13 and through-hole conductors 21 and 22 (see FIG. 3). In the present embodiment, the coil 10 includes a first coil conductor 11, a second coil conductor 12, and a third coil conductor 13. The first coil conductor 11, the second coil conductor 12, and the third coil conductor 13 are disposed to be separated from each other in the first direction D1. The coil conductors 11, 12, and 13 are disposed in the order of the first coil conductor 11, the second coil conductor 12, and the third coil conductor 13 along the first direction D1.

The first coil conductor 11 is disposed closest to the main face 2*c* and is opposed to the main face 2*c* in the first direction D1. The first coil conductor 11 is opposed to the electrode portions 3*b* and 4*b* in the first direction D1. The third coil conductor 13 is disposed closest to the main face 2*d* and is opposed to the main face 2*d* in the first direction D1. The second coil conductor 12 is disposed between the first coil conductor 11 and the third coil conductor 13 in the first direction D1. The second coil conductor 12 and the third coil conductor 13 are disposed closer to the main face 2*d* than the first coil conductor 11.

The first coil conductor 11, the second coil conductor 12, and the third coil conductor 13 each have a shape in which a part of the loop is disconnected, and each have a first end portion and a second end portion. The first coil conductor 11, the second coil conductor 12, and the third coil conductor 13 are electrically connected to each other.

The first end portion of the first coil conductor 11 is connected to the electrode portion 4*a* via the connecting conductor 23. The first end portion of the first coil conductor 11 constitutes the first end portion 10*a* of the coil 10. The connecting conductor 23 extends along the second direction D2 and connects the first end portion of the first coil conductor 11 and the electrode portion 4*a*. In the present embodiment, the first coil conductor 11 and the connecting conductor 23 are integrally formed.

The second end portion of the first coil conductor 11 is connected to the first end portion of the second coil conductor 12 via the through-hole conductor 21. The through-hole conductor 21 extends along the first direction D1 and connects the second end portion of the first coil conductor 11 and the first end portion of the second coil conductor 12. When viewed from the first direction D1, the second end portion of the first coil conductor 11 and the first end portion of the second coil conductor 12 overlap each other.

The second end portion of the second coil conductor 12 is connected to the first end portion of the third coil conductor 13 via the through-hole conductor 22. The through-hole conductor 22 extends along the first direction D1 and connects the second end portion of the second coil conductor 12 and the first end portion of the third coil conductor 13. When viewed from the first direction D1, the second end portion of the second coil conductor 12 and the first end portion of the third coil conductor 13 overlap each other.

The second end portion of the third coil conductor 13 is connected to the electrode portion 3*a* via the connecting conductor 24. The second end portion of the third coil conductor 13 constitutes the second end portion 10*a* of the coil 10. The connecting conductor 24 extends along the second direction D2 and connects the second end portion of the third coil conductor 13 and the electrode portion 3*a*. In the present embodiment, the third coil conductor 13 and the connecting conductor 24 are integrally formed.

The coil 10 has a rectangular annular shape when viewed from the first direction D1. The coil 10 includes a pair of first coil regions R1 and a pair of second coil regions R2. The two first coil regions R1 are opposed to each other sandwiching the coil axis AX in the second direction D2. The two second coil regions R2 are opposed to each other sandwiching the coil axis AX in the third direction D3.

In the present embodiment, in the first coil region R1 on the end face 2*a* side (close to the end face 2*a*), the first coil conductor 11 and the second coil conductor 12 are disposed, extend along the third direction D3, and are opposed to the end face 2*a* and the electrode portion 3*a*. In the first coil region R1 on the end face 2*b* side (close to the end face 2*b*), the first coil conductor 11, the second coil conductor 12, and the third coil conductor 13 are disposed, extend along the third direction D3, and are opposed to the end face 2*b* and the electrode portion 4*a*.

In the second coil region R2 on the side face 2*e* side (close to the side face 2*e*), the first coil conductor 11, the second coil conductor 12, and the third coil conductor 13 are disposed, extend along the second direction D2, and are opposed to the side face 2*e*. In the second coil region R2 on the side face 2*f* side (close to the side face 2*f*), the first coil conductor 11 and the second coil conductor 12 are disposed, extend along the second direction D2, and are opposed to the side face 2*f*.

Figure 4:
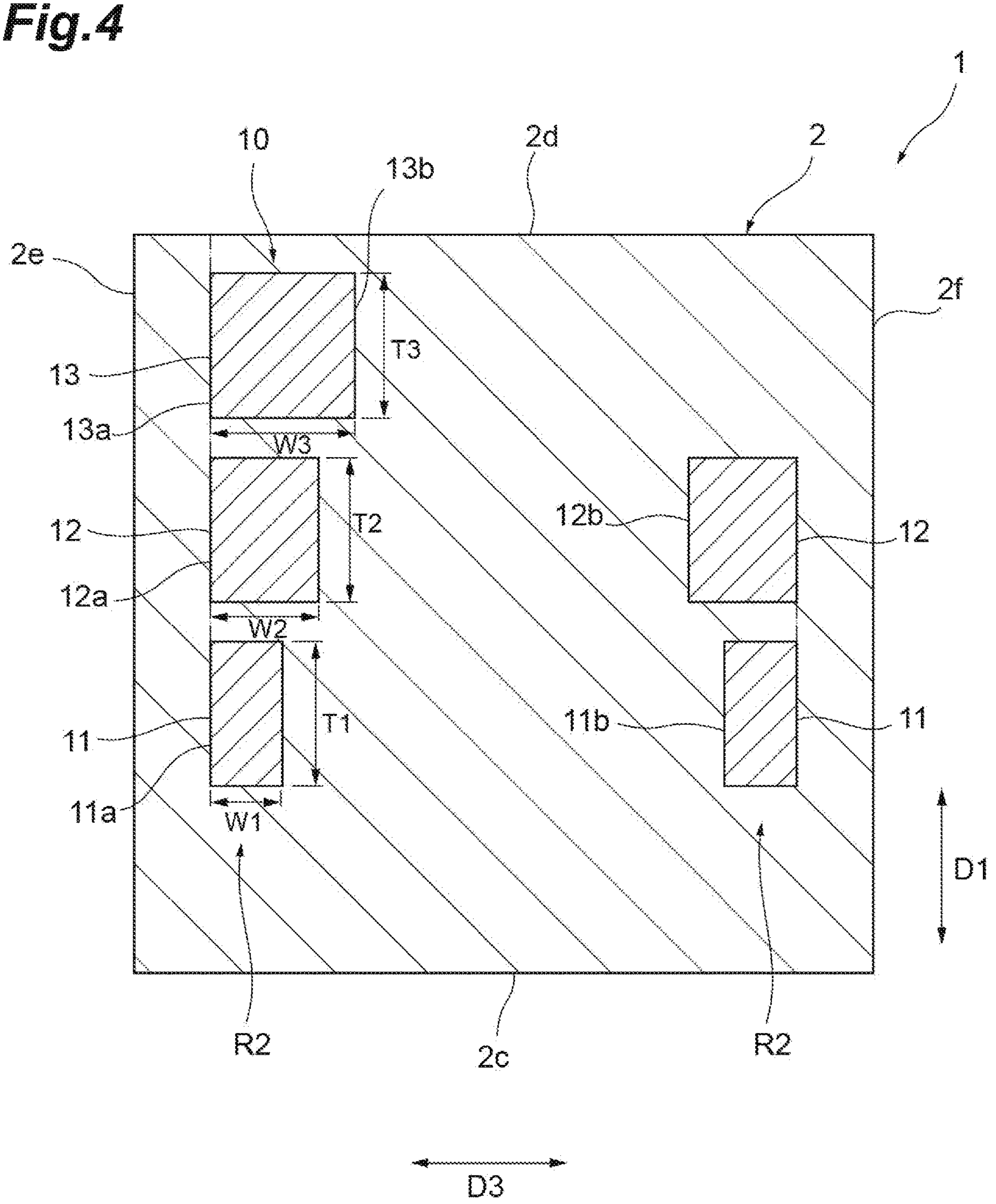
FIG. 4 is a cross-sectional view taken along the line IV-IV in FIG. 1.
Figure 5:
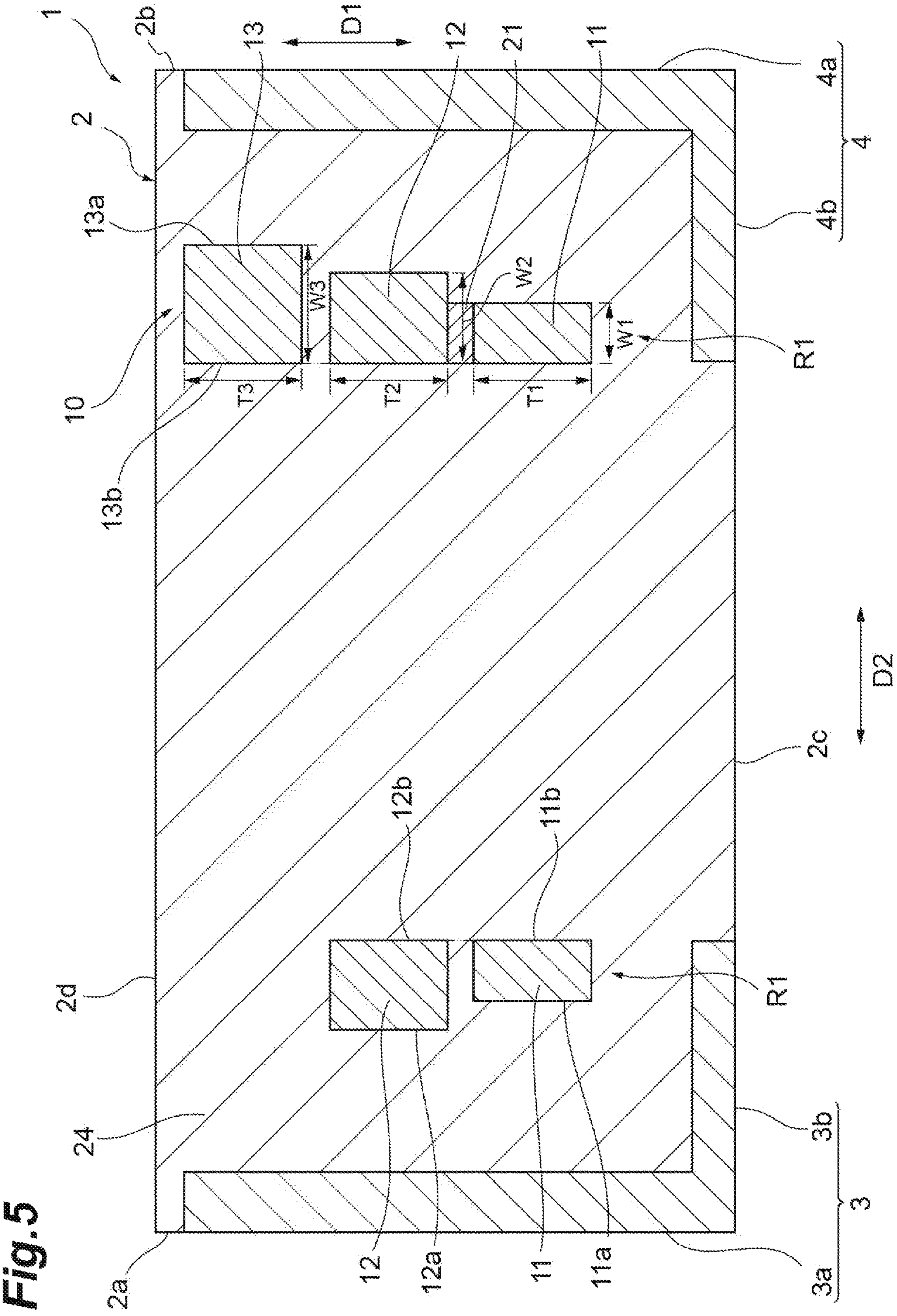
FIG. 5 is a cross-sectional view taken along the line V-V in FIG. 1.

As shown in FIGS. 4 and 5, the width W1 of the first coil conductor 11 is narrower than the width W2 of the second coil conductor 12 and the width W3 of the third coil conductor 13. In the present embodiment, the width W2 is narrower than the width W3. That is, the widths W1, W2, and W3 of the coil conductors 11, 12, and 13 become narrower toward the main face 2*c*. In other words, a coil conductor disposed closer to the main face 2*c* has a narrower width. Here, the widths W1, W2, and W3 in the first coil region R1 are the lengths of the coil conductors 11, 12, and 13 in the second direction D2. The widths W1, W2, and W3 in the second coil region R2 are the lengths of the coil conductors 11, 12, and 13 in the third direction D3.

In the present embodiment, the heights T1, T2, and T3 of the coil conductors 11, 12, and 13 are equal to each other. The heights T1, T2, and T3 are the lengths of the coil conductors 11, 12, and 13 in the first direction D1. Since the heights T1, T2, and T3 are equal to each other, it is possible to prevent the height of the multilayer coil component 1 (the length in the first direction D1) from increasing and to lower the size as compared with the height T1 being higher than the heights T2 and T3. If the height of the multilayer coil component 1 has been set, it is possible to prevent the number of turns of the coil 10 from decreasing. Accordingly, the inductance (L) of the multilayer coil component 1 is maintained.

The aspect ratio T1/W1 of the first coil conductor 11 is higher than the aspect ratio T2/W2 of the second coil conductor 12 and the aspect ratio T3/W3 of the third coil conductor 13. In the present embodiment, the aspect ratio T2/W2 is higher than the aspect ratio T3/W3. That is, the aspect ratios T1/W1, T2/W2, and T3/W3 of the coil conductors 11, 12, and 13 become higher toward the main face 2*c*. In other words, a coil conductor disposed closer to the main face 2*c* has a higher aspect ratio.

In the present embodiment, the cross-sectional area of the first coil conductor 11 is smaller than the cross-sectional area of the second coil conductor 12 and the cross-sectional area of the third coil conductor 13. The cross-sectional area of the second coil conductor 12 is smaller than the cross-sectional area of the third coil conductor 13. That is, the cross-sectional areas of the coil conductors 11, 12, and 13 become smaller toward the main face 2*c*. In other words, a coil conductor disposed closer to the main face 2*c* has a smaller cross-sectional area. Here, the cross-sectional areas of the coil conductors 11, 12, and 13 are the areas of the cross-section orthogonal to the axial direction of the coil conductors 11, 12, and 13.

The width W1 and the height T1 are constant throughout the first coil conductor 11. The width W2 and the height T2 are constant throughout the second coil conductor 12. The width W3 and the height T3 are constant throughout the third coil conductor 13.

As shown in FIG. 4, in the second coil region R2 on the side face 2*e* side, an outer edge 11*a* of the first coil conductor 11 aligns with an outer edge 12*a* of the second coil conductor 12 and an outer edge 13*a* of the third coil conductor 13 when viewed from the first direction D1. An inner edge 11*b* of the first coil conductor 11 is positioned closer to the outer side (side face 2*e*) than an inner edge 12*b* of the second coil conductor 12 and an inner edge 13*b* of the third coil conductor 13. The inner edge 12*b* is positioned closer to the outer side than the inner edge 13*b* when viewed from the first direction D1. That is, the inner edges 11*b*, 12*b*, and 13*b* of the coil conductors 11, 12, and 13 become positioned closer to the outer side toward the main face 2*c*. In other words, a coil conductor disposed closer to the main face 2*c* has an inner edge positioned closer to the outer side. In the second coil region R2 on the side face 2*f* side, the outer edge 11*a* aligns with the outer edge 12*a* when viewed from the first direction D1. The inner edge 11*b* is positioned closer to the outer side (side face 2*f*) than the inner edge 12*b*.

As shown in FIG. 5, in the first coil region R1 on the end face 2*b* side, the inner edge 11*b* aligns with the inner edge 12*b* and the inner edge 13*b* when viewed from the first direction D1. The outer edge 11*a* is positioned closer to the inner side (end face 2*a*) than the outer edge 12*a* and the outer edge 13*a*. When viewed from the first direction D1, the outer edge 12*a* is positioned closer to the inner side than the outer edge 13*a*. That is, the outer edges 11*a*, 12*a*, and 13*a* of the coil conductors 11, 12, and 13 become positioned closer to the inner side toward the main face 2*c*. In other words, a coil conductor disposed closer to the main face 2*c* has an outer edge positioned closer to the inner side. In the first coil region R1 on the end face 2*a* side, the inner edge 11*b* aligns with the inner edge 12*b* when viewed from the first direction D1. The outer edge 11*a* is positioned closer to the inner side (the end face 2*b*) than the outer edge 12*a*.

The first coil conductor 11, the second coil conductor 12, the third coil conductor 13, and the connecting conductors 23 and 24 each contain a conductive material. The conductive material contains Ag or Pd. The first coil conductor 11, the second coil conductor 12, the third coil conductor 13, and the connecting conductors 23 and 24 each are formed as a sintered body of a conductive paste containing a conductive material powder. The conductive material powder contains, for example, Ag powder or Pd powder.

In the present embodiment, the first coil conductor 11, the second coil conductor 12, the third coil conductor 13, and the connecting conductors 23 and 24 contain the same conductive material as the terminal electrodes 3 and 4. The first coil conductor 11, the second coil conductor 12, the third coil conductor 13, and the connecting conductors 23 and 24 may contain a conductive material different from the terminal electrodes 3 and 4.

The first coil conductor 11, the second coil conductor 12, the third coil conductor 13, and the connecting conductors 23 and 24 each are provided in a defective portion formed in the corresponding insulator layer. The first coil conductor 11, the second coil conductor 12, the third coil conductor 13, and the connecting conductors 23 and 24 each are formed by firing the conductive paste positioned in the defective portion formed in a green sheet.

The defective portion formed in the green sheet is formed by, for example, the following process. First, a green sheet is formed by applying an element-body paste containing a constituent material of the insulator layer and a photosensitive material on a substrate. The substrate is, for example, a PET film. The photosensitive material contained in the element-body paste may be either a negative type or a positive type, and a known photosensitive material can be used. Then, using the mask corresponding to the defective portion, the green sheet is exposed and developed by a photolithography method to form the defective portion in the green sheet on the substrate. The green sheet in which the defective portion is formed is an element-body pattern.

The electrode layers, the first coil conductor 11, the second coil conductor 12, the third coil conductor 13, and the connecting conductors 23 and 24 are formed by, for example, the following process.

First, a conductor material layer is formed by applying a conductive paste containing a photosensitive material on a substrate. The photosensitive material contained in the conductive paste may be either a negative type or a positive type, and a known photosensitive material can be used. Then, using the mask corresponding to the defective portion, the conductor material layer is exposed and developed by a photolithography method to form a conductor pattern corresponding to the shape of the defective portion on the substrate.

The multilayer coil component 1 is obtained by, for example, the following process following the process described above. The conductor pattern is combined with the defective portion of the element-body pattern to prepare a sheet in which the element-body pattern and the conductor pattern are in the same layer. After heat-treating the laminate obtained by laminating the predetermined number of prepared sheets, a plurality of green chips are obtained from the laminate. In this process, the green laminate is cut into chips by, for example, a cutting machine. Accordingly, a plurality of green chips having a predetermined size can be obtained. Next, the green chips are fired. With this firing, the multilayer coil component 1 is obtained. The surface of each of the terminal electrodes 3 and 4 may be formed with a plating layer. The plating layer is formed by, for example, electroplating or electroless plating. The plating layer contains, for example, Ni, Sn, or Au.

Second Embodiment

Figure 6:
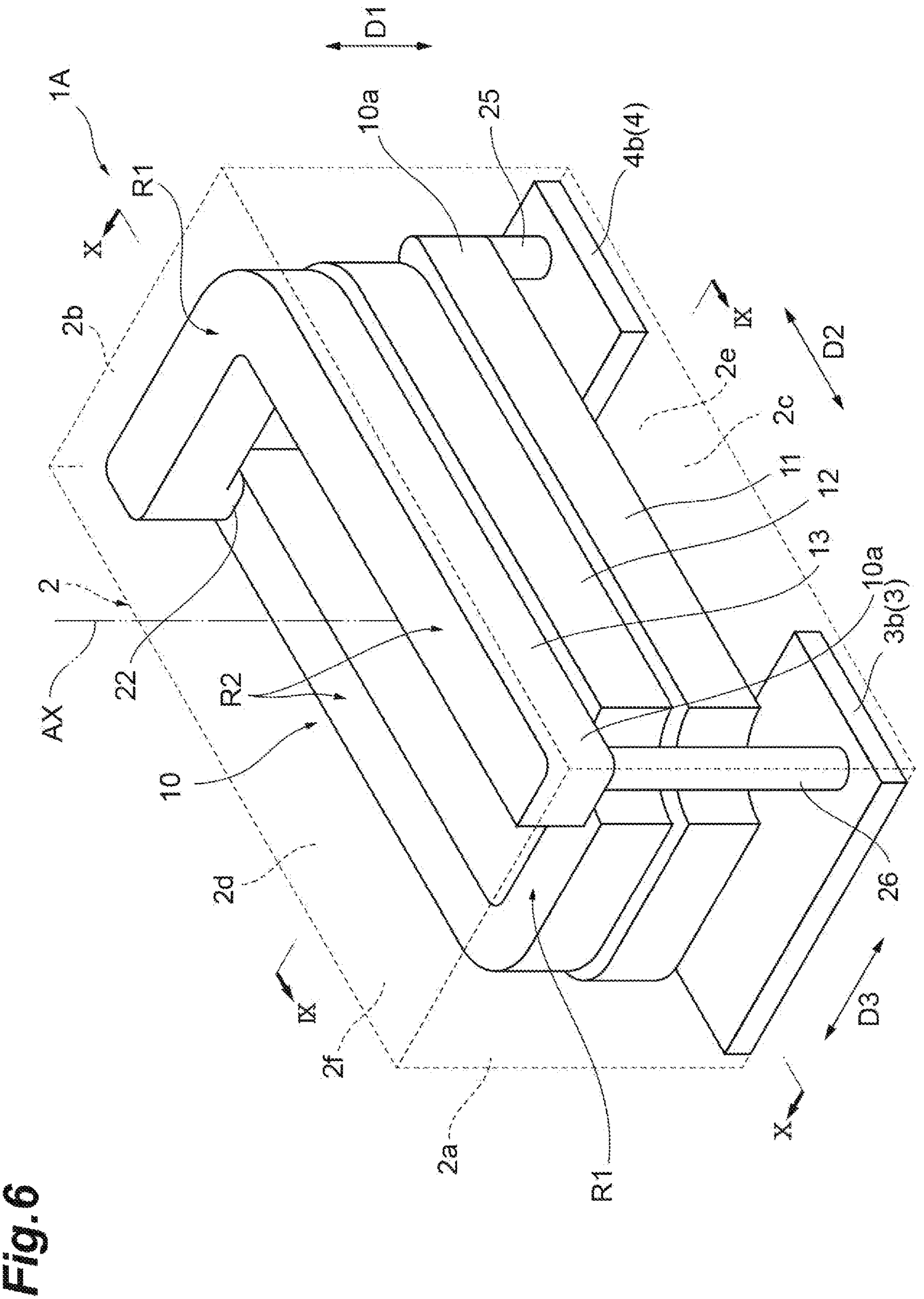
FIG. 6 is a perspective view of a multilayer coil component according to a second embodiment.
Figure 7:
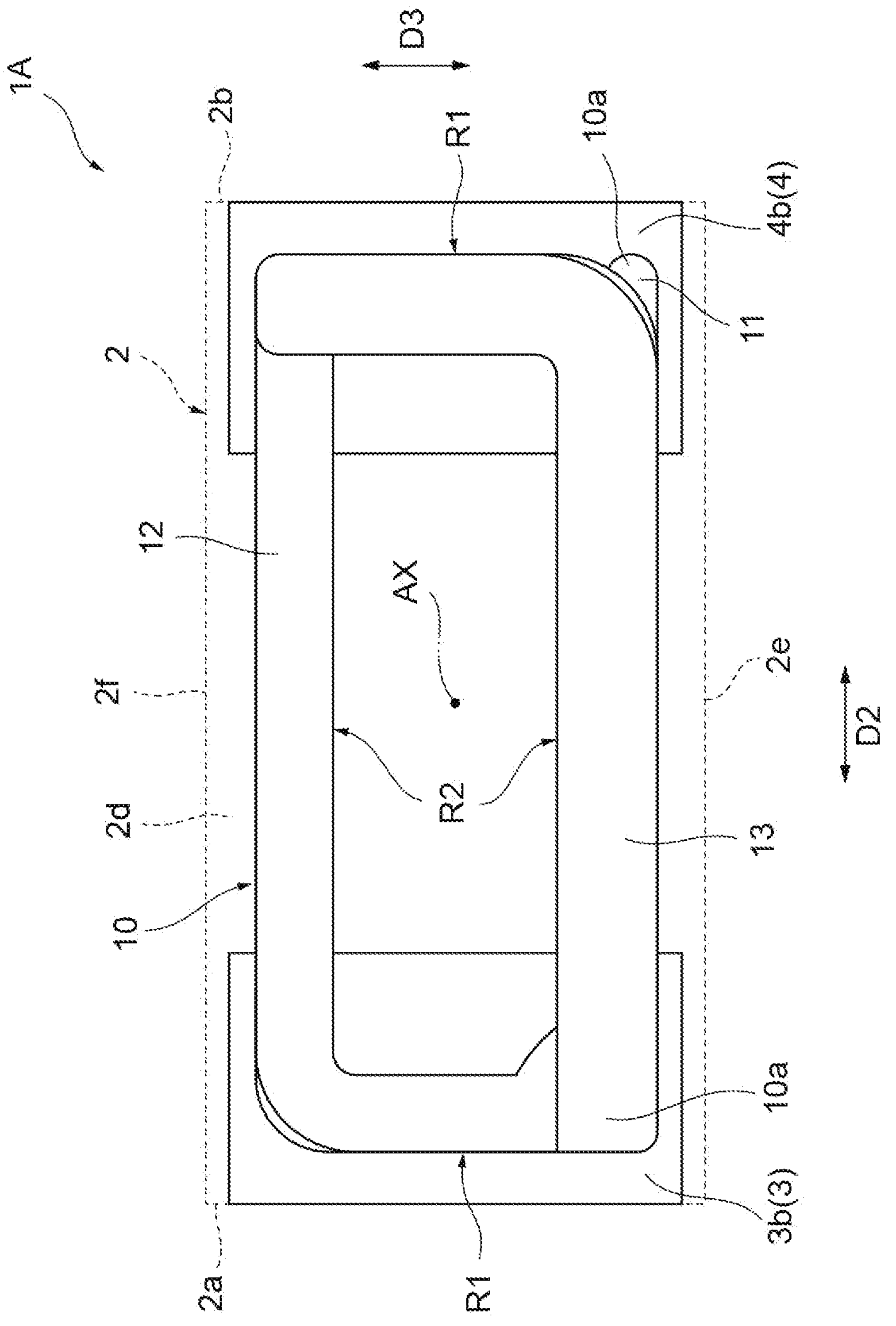
FIG. 7 is a top view of the multilayer coil component in FIG. 6.
Figure 8:
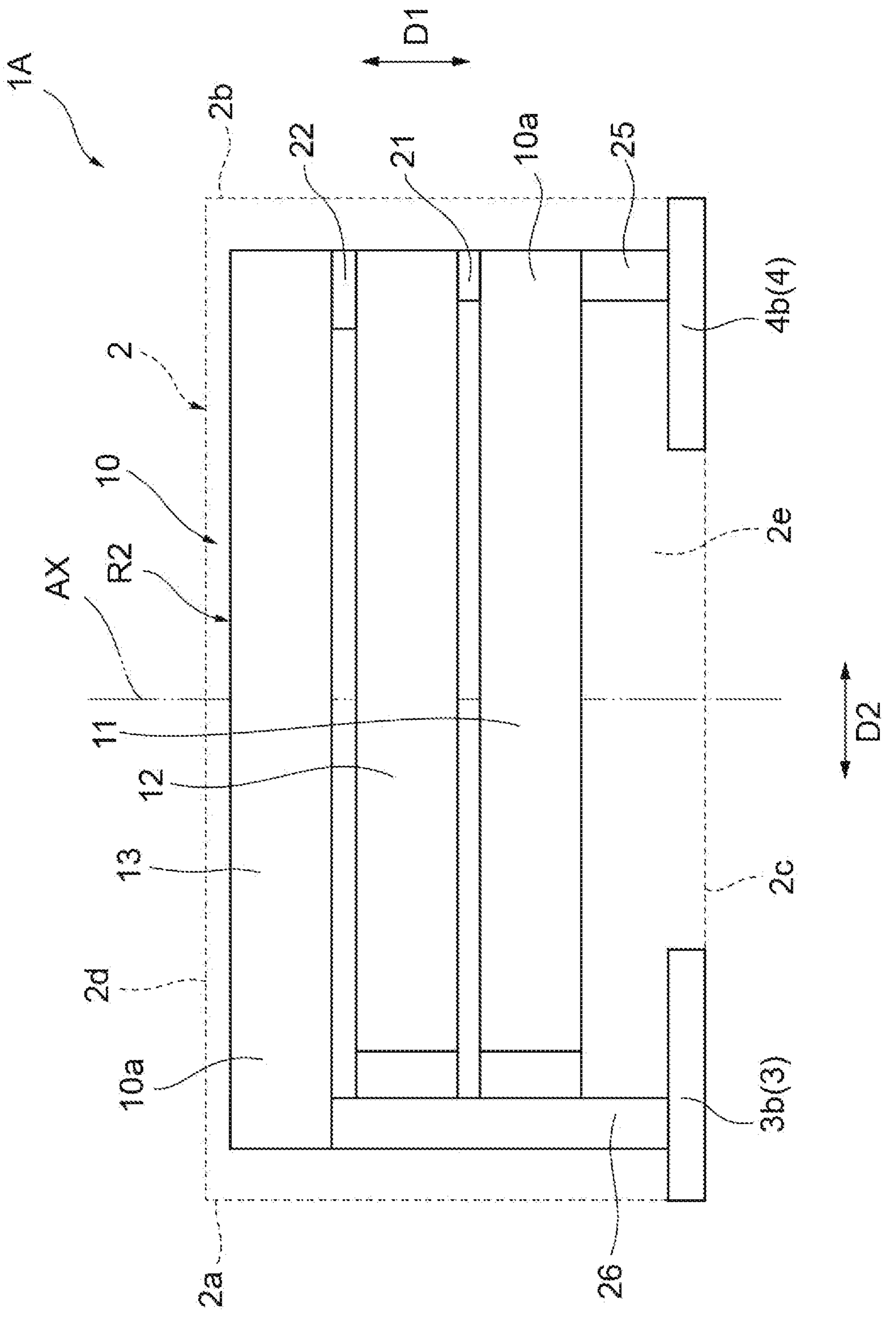
FIG. 8 is a side view of the multilayer coil component in FIG. 6.

With reference to FIGS. 6 to 10, a multilayer coil component 1A according to a second embodiment will be described focusing on the differences from the multilayer coil component 1 (see FIGS. 1 to 5). In FIGS. 6 to 8, an element body 2 is shown by a broken line. In the multilayer coil component 1A, a terminal electrode 3 does not include an electrode portion 3*a* and includes only an electrode portion 3*b*, and a terminal electrode 4 does not include an electrode portion 4*a* and includes only an electrode portion 4*b*. The multilayer coil component 1A includes connecting conductors 25 and 26 instead of the connecting conductors 23 and 24 of the multilayer coil component 1. The connecting conductors 25 and 26 each have, for example, a columnar shape with a circular cross section and extend along the first direction D1. The connecting conductor 25 electrically connects the terminal electrode 4 and a first end portion 10*a* of a coil 10. The connecting conductor 26 electrically connects the terminal electrode 3 and a second end portion 10*a* of the coil 10.

A first coil conductor 11 and a second coil conductor 12 each are formed with a recess at a position overlapping the second end portion of 10*a* of the coil 10 when viewed from the first direction D1. The recess is provided to avoid interference with the connecting conductor 26. The inner surfaces of the recesses are opposed to the outer surface of the connecting conductor 26. The connecting conductor 26 is disposed separated from the first coil conductor 11 and the second coil conductor 12 due to the recesses.

Figure 9:
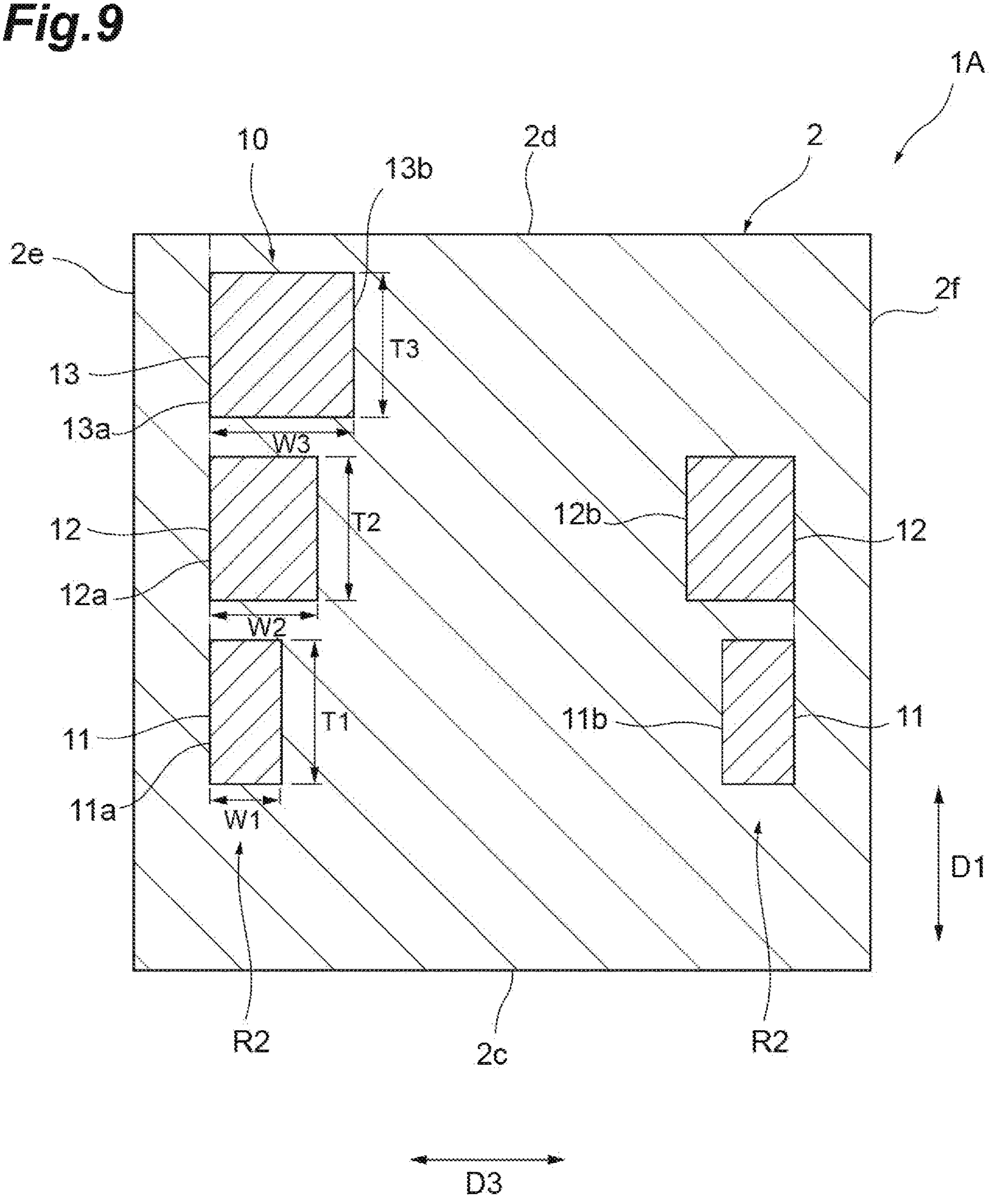
FIG. 9 is a cross-sectional view taken along the line IX-IX in FIG. 6.

As shown in FIG. 9, in a second coil region R2 on a side face 2*e* side, an outer edge 11*a* aligns with an outer edge 12*a* and an outer edge 13*a* when viewed from the first direction D1. An inner edge 11*b* is positioned closer to the outer side (side face 2*e*) than an inner edge 12*b* and an inner edge 13*b*. The inner edge 12*b* is positioned closer to the outer side than the inner edge 13*b* when viewed from the first direction D1. That is, the inner edges 11*b*, 12*b*, and 13*b* of the coil conductors 11, 12, and 13 become positioned closer to the outer side toward the main face 2*c*. In other words, a coil conductor disposed closer to the main face 2*c* has an inner edge positioned closer to the outer side. In the second coil region R2 on the side face 2*f* side, the outer edge 11*a* aligns with the outer edge 12*a* when viewed from the first direction D1. The inner edge 11*b* is positioned closer to the outer side (side face 2*f*) than the inner edge 12*b*.

Figure 10:
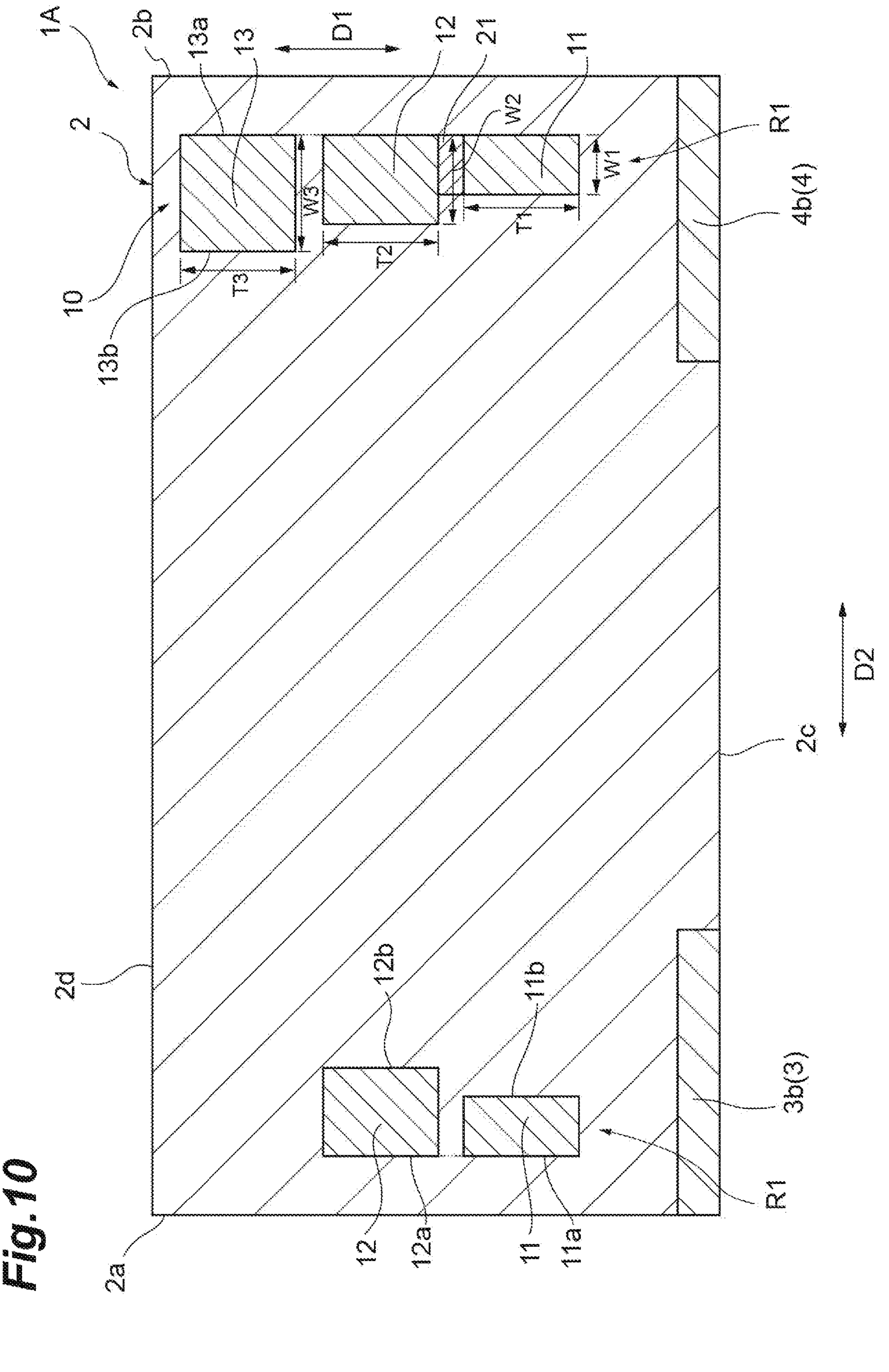
FIG. 10 is a cross-sectional view taken along the line X-X in FIG. 6.

As shown in FIG. 10, in a first coil region R1 on an end face 2*b* side, the outer edge 11*a* aligns with the outer edge 12*a* and the outer edge 13*a* when viewed from the first direction D1. The inner edge 11*b* is positioned closer to the outer side (the end face 2*b*) than the inner edge 12*b* and the inner edge 13*b*. The inner edge 12*b* is positioned closer to the outer side than the inner edge 13*b* when viewed from the first direction D1. That is, the inner edges 11*b*, 12*b*, and 13*b* of the coil conductors 11, 12, and 13 become positioned closer to the outer side toward the main face 2*c*. In other words, a coil conductor disposed closer to the main face 2*c* has an inner edge positioned closer to the outer side. In the first coil region R1 on the end face 2*a* side, the outer edge 11*a* aligns with the outer edge 12*a* when viewed from the first direction D1. The inner edge 11*b* is positioned closer to the outer side (the end face 2*a*) than the inner edge 12*b*.

As described above, in each of the multilayer coil components 1 and 1A, the first coil conductor 11 of the coil conductors 11, 12, and 13 is disposed closest to the main face 2*c* and is opposed to the electrode portions 3*b* and 4*b*. Thus, stray capacitance is formed between the first coil conductor 11 and the electrode portions 3*b* and 4*b* depending on the area where the first coil conductor 11 is opposed to the electrode portions 3*b* and 4*b*. The width W1 of the first coil conductor 11 is narrower than the width W2 of the second coil conductor 12 disposed closer to the main face 2*d* than the first coil conductor 11. Thus, the area where the first coil conductor 11 is opposed to the electrode portions 3*b* and 4*b* is smaller than that when the width W1 is about equal to the width W2. For this reason, it is possible to reduce the stray capacitance formed between the first coil conductor 11 and the electrode portions 3*b* and 4*b*. Accordingly, it is possible to prevent the self-resonant frequency of the multilayer coil components 1 and 1A from lowering.

The aspect ratio T1/W1 of the first coil conductor 11 is higher than the aspect ratio T2/W2 of the second coil conductor 12. Thus, it is possible to increase the cross-sectional area of the first coil conductor 11 as compared with the aspect ratio T1/W1 being about equal to the aspect ratio T2/W2. Accordingly, it is possible to prevent the Q-values of the multilayer coil components 1 and 1A from decreasing. From the above, it is possible to prevent deterioration in the characteristics of the multilayer coil components 1 and 1A.

The widths W1, W2, and W3 of the coil conductors 11, 12, and 13 become narrower toward the main face 2*c*. The aspect ratios T1/W1, T2/W2, and T3/W3 of the coil conductors 11, 12, and 13 become higher toward the main face 2*c*. Thus, it is possible to further prevent the deterioration in the characteristics of the multilayer coil components 1 and 1A.

In each of the multilayer coil components 1 and 1A, the outer edge 11*a* aligns with the outer edge 12*a* in the second coil regions R2 when viewed from the first direction D1. The width W1 is narrower than the width W2. Thus, the inner edge 11*b* is positioned closer to the outer side than the inner edge 12*b* when viewed from the first direction D1. Thus, the inner diameter of the first coil conductor 11 is larger than that when the inner edge 11*b* aligns with the inner edge 12*b* when viewed from the first direction D1. Therefore, it is possible to improve the Q value and the inductance (L).

In the multilayer coil component 1A, the outer edge 11*a* aligns with the outer edge 12*a* when viewed from the first direction D1 not only in the second coil regions R2 but also in the first coil regions R1. Thus, it is possible to further improve the Q value and the inductance (L).

In the multilayer coil component 1, the first coil conductor 11 is opposed to the electrode portions 3*b* and 4*b* in the first coil regions R1. The inner edge 11*b* aligns with the inner edge 12*b* in the first coil regions R1 when viewed from the first direction D1. Thus, the distance between the first coil conductor 11 and the electrode portions 3*b* and 4*b* is widened. Thus, it is possible to reduce the stray capacitance formed between the first coil conductor 11 and the electrode portions 3*b* and 4*b*. Accordingly, it is possible further prevent the self-resonant frequency of the multilayer coil component 1 from lowering while improving the Q value and the inductance (L).

The embodiments of the present invention have been described above; the present invention is not necessarily limited to the above described embodiments, and can be variously changed without departing from the gist.

Figure 11:
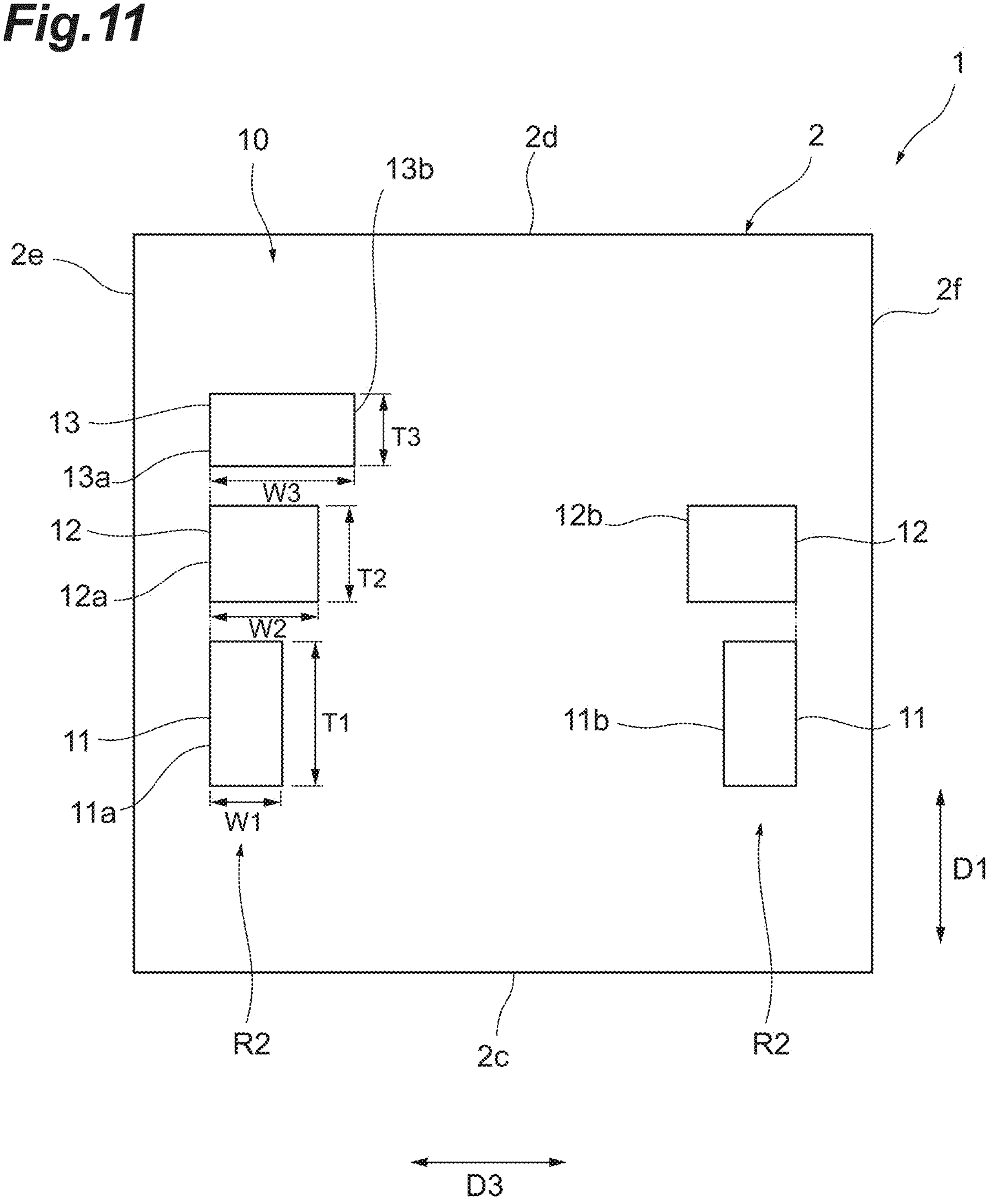
FIG. 11 is another cross-sectional view taken along the line IV-IV in FIG. 1.

The cross-sectional area of the first coil conductor 11 may be equal to the cross-sectional area of the second coil conductor 12, as shown in FIG. 11. In this case, it is possible to reliably prevent the Q value from decreasing. In addition, the cross-sectional area of the first coil conductor 11 may be equal to the cross-sectional area of the second coil conductor 12 and the cross-sectional area of the third coil conductor 13. In this case, it is possible to more reliably prevent the Q value from decreasing.

In the above embodiments, the coil 10 having the first coil conductor 11, the second coil conductor 12, and the third coil conductor 13 has been exemplified. However, the number of coil conductors forming the coil 10 is not limited to the above.

What is claimed is:

1. A multilayer coil component comprising:
- an element body having a rectangular parallelepiped shape and including a first main face and a second main face opposed to each other in a first direction, a first end face and a second end face opposed to each other in a second direction intersecting the first direction, and a first side face and a second side face opposed to each other in a third direction intersecting the first direction and the second direction;
- a coil including a coil axis along the first direction and disposed in the element body; and
- a terminal electrode electrically connected to the coil, wherein
- the terminal electrode includes a main-face electrode portion provided on the first main face,
- the coil includes a plurality of coil conductors disposed to be separated from each other in the first direction and electrically connected to each other,
- the plurality of coil conductors includes a first coil conductor disposed closest to the first main face to oppose to the main-face electrode portion and a second coil conductor disposed closer to the second main face than the first coil conductor,
- the first coil conductor has a width narrower than a width of the second coil conductor,
- the first coil conductor has an aspect ratio higher than an aspect ratio of the second coil conductor,
- the first coil conductor has, when viewed from the first direction, (i) an outer edge aligning with an outer edge of the second coil conductor and an inner edge not aligning with an inner edge of the second coil conductor, or (ii) an outer edge not aligning with an outer edge of the second coil conductor and an inner edge aligning with an inner edge of the second coil conductor, and
- the first coil conductor has a cross-sectional area equal to a cross-sectional area of the second coil conductor.

2. The multilayer coil component according to claim 1, wherein
- the plurality of coil conductors has a width becoming narrower toward the first main face, and
- the plurality of coil conductors has an aspect ratio becoming higher toward the first main face.

3. The multilayer coil component according to claim 1, wherein
- the first coil conductor has, when viewed from the first direction, an outer edge aligning with an outer edge of the second coil conductor.

4. The multilayer coil component according to claim 1, wherein
- the terminal electrode further includes an end-face electrode portion provided on the first end face,
- the first coil conductor is opposed to the end-face electrode portion,
- the coil includes a pair of first coil regions opposed to each other sandwiching the coil axis in the second direction, and
- the inner edge of the first coil conductor has a first portion aligning with a first portion of the inner edge of the second coil conductor in the pair of first coil regions.

5. The multilayer coil component according to claim 4, wherein
- the coil includes:
- a pair of second coil regions opposed to each other sandwiching the coil axis in the third direction, and
- the inner edge of the first coil conductor has a second portion that aligns with a second portion of the inner edge of the second coil conductor in the pair of second coil regions.

6. A multilayer coil component comprising:
- an element body having a rectangular parallelepiped shape and including a first main face and a second main face opposed to each other in a first direction, a first end face and a second end face opposed to each other in a second direction intersecting the first direction, and a first side face and a second side face opposed to each other in a third direction intersecting the first direction and the second direction;
- a coil including a coil axis along the first direction and disposed in the element body; and
- a terminal electrode electrically connected to the coil, wherein
- the terminal electrode includes a main-face electrode portion provided on the first main face,
- the coil includes a plurality of coil conductors disposed to be separated from each other in the first direction and electrically connected to each other,
- the plurality of coil conductors includes a first coil conductor disposed closest to the first main face to oppose to the main-face electrode portion and a second coil conductor disposed closer to the second main face than the first coil conductor,
- the first coil conductor has a width narrower than a width of the second coil conductor,
- the first coil conductor has an aspect ratio higher than an aspect ratio of the second coil conductor,
- a length of each of the plurality of coil conductors in the first direction is longer than a distance between adjacent coil conductors in the first direction, and the first coil conductor has a cross-sectional area equal to a cross-sectional area of the second coil conductor.

7. The multilayer coil component according to claim 6, wherein the plurality of coil conductors has a width becoming narrower toward the first main face, and the plurality of coil conductors has an aspect ratio becoming higher toward the first main face.

8. The multilayer coil component according to claim 6, wherein the first coil conductor has, when viewed from the first direction, an outer edge aligning with an outer edge of the second coil conductor.

9. The multilayer coil component according to claim 6, wherein the terminal electrode further includes an end-face electrode portion provided on the first end face, the first coil conductor is opposed to the end-face electrode portion, the coil includes a pair of first coil regions opposed to each other sandwiching the coil axis in the second direction, and the first coil conductor has, when viewed from the first direction, an inner edge with a first portion aligning with a first portion of an inner edge of the second coil conductor in the pair of first coil regions.

10. The multilayer coil component according to claim 9, wherein the coil includes:

a pair of second coil regions opposed to each other sandwiching the coil axis in the third direction, and when viewed from the first direction, the inner edge of the first coil conductor has a second portion that aligns with a second portion of the inner edge of the second coil conductor in the pair of second coil regions.

* * * * *